United States Patent
Zhu et al.

(10) Patent No.: US 10,365,649 B2
(45) Date of Patent: Jul. 30, 2019

(54) LANE CURB ASSISTED OFF-LANE CHECKING AND LANE KEEPING SYSTEM FOR AUTONOMOUS DRIVING VEHICLES

(71) Applicants: Baidu USA LLC, Sunnyvale, CA (US); Baidu.com Times Technology (Beijing) Co., Ltd., Beijing (CN)

(72) Inventors: Fan Zhu, Sunnyvale, CA (US); Qi Kong, Sunnyvale, CA (US); Qi Luo, Sunnyvale, CA (US); Xiang Yu, Sunnyvale, CA (US); Sen Hu, Sunnyvale, CA (US); Zhenguang Zhu, Beijing (CN); Xiaoxin Fu, Beijing (CN); Jiarui He, Beijing (CN); Hongye Li, Beijing (CN); Yuchang Pan, Beijing (CN); Zhongpu Xia, Beijing (CN); Chunming Zhao, Beijing (CN); Guang Yang, San Jose, CA (US); Jingao Wang, Sunnyvale, CA (US)

(73) Assignees: BAIDU USA LLC, Sunnyvale, CA (US); BAIDU.COM TIMES TECHNOLOGY (BEIJING) CO., LTD., Beijing (CN)

(*) Notice: Subject to any disclaimer, the term of this patent is extended or adjusted under 35 U.S.C. 154(b) by 63 days.

(21) Appl. No.: 15/522,218

(22) PCT Filed: Apr. 19, 2017

(86) PCT No.: PCT/CN2017/081057
§ 371 (c)(1),
(2) Date: Apr. 26, 2017

(87) PCT Pub. No.: WO2018/191881
PCT Pub. Date: Oct. 25, 2018

(65) Prior Publication Data
US 2018/0307234 A1    Oct. 25, 2018

(51) Int. Cl.
*G05D 1/00* (2006.01)
*G05D 1/02* (2006.01)

(52) U.S. Cl.
CPC ......... *G05D 1/0212* (2013.01); *G05D 1/0088* (2013.01); *G05D 1/0246* (2013.01); *G05D 2201/0213* (2013.01)

(58) Field of Classification Search
CPC .. G05D 1/0212; G05D 1/0246; G05D 1/0088; G05D 2201/0213; G06K 9/00798; B60R 2300/804
See application file for complete search history.

(56) References Cited

U.S. PATENT DOCUMENTS 7,660,669 B2 * 2/2010 Tsuda .................. B60T 8/17557
340/436
9,056,630 B2 * 6/2015 Han ..................... B62D 15/029
(Continued)

Primary Examiner — Michael J Zanelli
(74) Attorney, Agent, or Firm — Womble Bond Dickinson (US) LLP

(57) ABSTRACT

In one embodiment, a lane departure detection system detects at a first point in time that a wheel of an ADV rolls onto a lane curb disposed on an edge of a lane in which the ADV is moving. The system detects at a second point in time that the wheel of the ADV rolls off the lane curb of the lane. The system calculates an angle between a moving direction of the ADV and a lane direction of the lane based on the time difference between the first point in time and the second point in time in view of a current speed of the ADV. The system then generates a control command based on the angle to adjust the moving direction of the ADV in order to prevent the ADV from further drifting off the lane direction of the lane.

26 Claims, 10 Drawing Sheets

(56) References Cited

U.S. PATENT DOCUMENTS

2014/0222306 A1\* 8/2014 Wanami ................ B60K 28/14
 701/70
2015/0375784 A1\* 12/2015 Ogawa ................ B62D 15/025
 701/41

\* cited by examiner

LANE CURB ASSISTED OFF-LANE CHECKING AND LANE KEEPING SYSTEM FOR AUTONOMOUS DRIVING VEHICLES

CROSS-REFERENCE TO RELATED APPLICATION

This patent application is a U.S. National Phase Application under 35 U.S.C. § 371 of International Application No. PCT/CN2017/081057, filed Apr. 19, 2017, entitled "LANE CURB ASSISTED OFF-LANE CHECKING AND LANE KEEPING SYSTEM FOR AUTONOMOUS DRIVING VEHICLES," which is incorporated by reference herein by its entirety.

TECHNICAL FIELD

Embodiments of the present invention relate generally to operating autonomous vehicles. More particularly, embodiments of the invention relate to lane departure detection based on lane curb sensing.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. It is important for an autonomous driving vehicle (ADV) to drive and remain within a lane in which the ADV is moving. However, it is possible that the perception or planning of autonomous driving could be inaccurate and do not detect that the ADV does not follow the lane correctly. It is difficult to detect such a scenario, especially when the lane is not painted in contrast enough.

SUMMARY

Embodiments of the present disclosure provide a computer-implemented method for operating an autonomous driving vehicle, a non-transitory machine-readable medium, and a data processing system.

In an aspect of the disclosure, the computer-implemented method for operating an autonomous driving vehicle comprises: detecting, a first point in time, that a wheel of an autonomous driving vehicle (ADV) rolls onto a lane curb disposed on an edge of a lane in which the ADV is moving; detecting, at a second point in time, that the wheel of the ADV rolls off the lane curb of the lane; calculating an angle between a moving direction of the ADV and a lane direction of the lane based on a difference between the first point in time and the second point in time in view of a current speed of the ADV; and generating a control command based on the angle to adjust the moving direction of the ADV to prevent the ADV from further drifting off the lane direction of the lane.

In another aspect of the disclosure, the non-transitory machine-readable medium has instructions stored therein, which when executed by a processor, cause the processor to perform operations of operating an autonomous driving vehicle, the operations comprising: detecting, a first point in time, that a wheel of an autonomous driving vehicle (ADV) rolls onto a lane curb disposed on an edge of a lane in which the ADV is moving; detecting, at a second point in time, that the wheel of the ADV rolls off the lane curb of the lane; calculating an angle between a moving direction of the ADV and a lane direction of the lane based on a difference between the first point in time and the second point in time in view of a current speed of the ADV; and generating a control command based on the angle to adjust the moving direction of the ADV to prevent the ADV from further drifting off the lane direction of the lane.

In a further aspect of the disclosure, the data processing system comprises a processor; and a memory coupled to the processor to store instructions, which when executed by the processor, cause the processor to perform operations, the operations including: detecting, a first point in time, that a wheel of an autonomous driving vehicle (ADV) rolls onto a lane curb disposed on an edge of a lane in which the ADV is moving, detecting, at a second point in time, that the wheel of the ADV rolls off the lane curb of the lane, calculating an angle between a moving direction of the ADV and a lane direction of the lane based on a difference between the first point in time and the second point in time in view of a current speed of the ADV, and generating a control command based on the angle to adjust the moving direction of the ADV to prevent the ADV from further drifting off the lane direction of the lane.

In a further aspect of the disclosure, the computer-implemented method for operating an autonomous driving vehicle comprises: detecting, a first point in time, that a first wheel of an autonomous driving vehicle (ADV) contacts a lane curb disposed on an edge of a lane in which the ADV is moving; detecting, at a second point in time, that a second wheel of the ADV contacts the lane curb of the lane; calculating an angle between a moving direction of the ADV and a lane direction of the lane based on a difference between the first point in time and the second point in time in view of a current speed of the ADV; and generating a control command based on the angle to adjust the moving direction of the ADV to prevent the ADV from further drifting off the lane direction of the lane.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
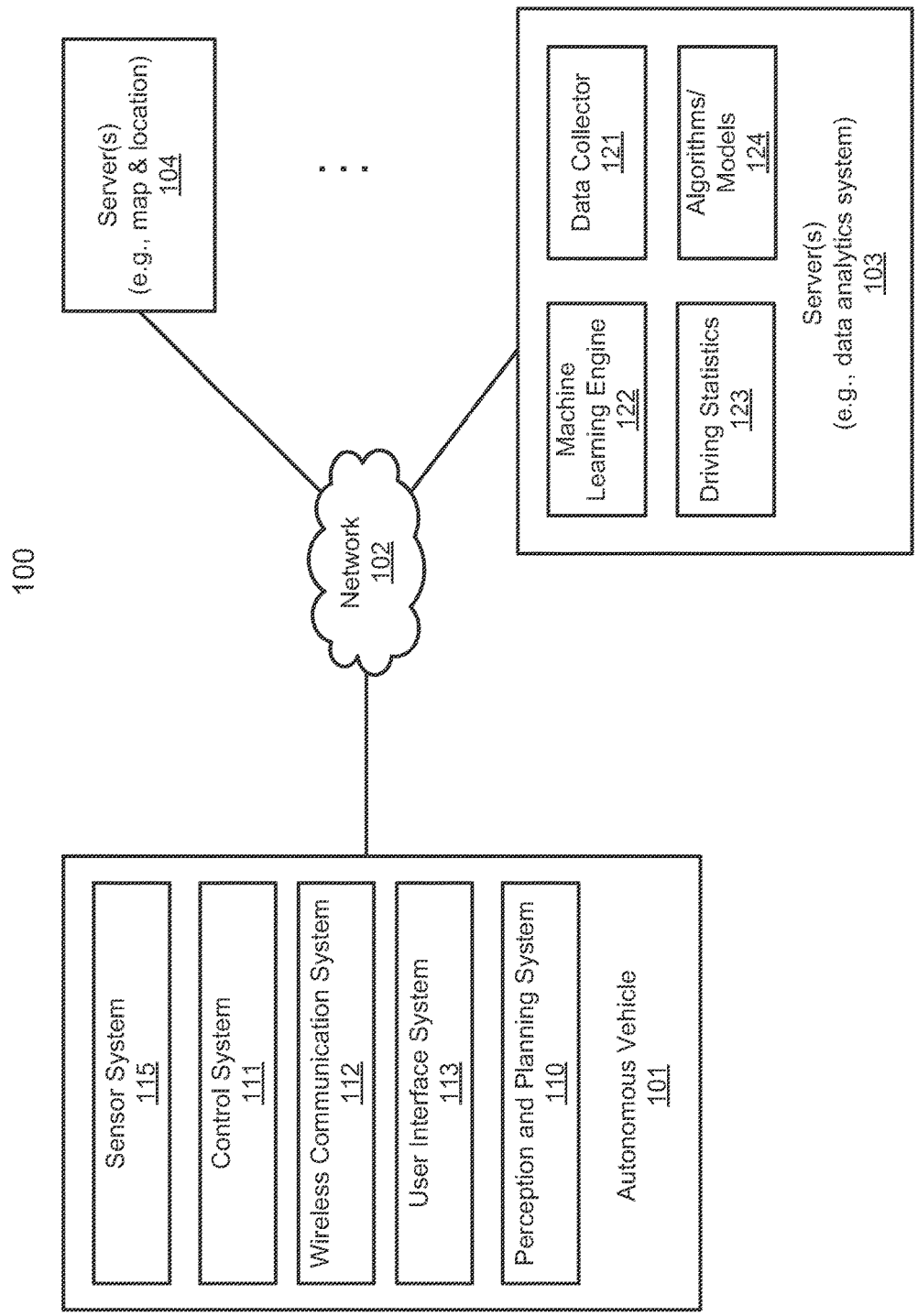
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a lane departure detection system is configured to detect that an ADV is departing from the lane in which the ADV is driving based on sensor data captured when the ADV contacts a lane curb disposed on the edge of the lane, either on the shoulder of the lane or between lanes. When the ADV contacts the lane curb, the lane departure detection system detects and calculates an angle between a moving direction of the ADV and a lane direction of the lane based on timing of the contacts in view of the speed of the ADV. Based on the angle, the system calculates how much the moving direction of the ADV is off compared to a lane direction of the lane. The lane direction is typically substantially in parallel with a longitudinal axis or direction of a lane curb or a distribution line or pattern of an array of lane curb segments of the lane curb disposed on an edge of a lane or between lanes. A control command such as a speed control command and/or a steering control command is generated based on the angle and/or the distance that ADV is off from the lane to correct the moving direction of the ADV.

In one aspect of the invention, a lane departure detection system detects at a first point in time that a wheel of an ADV rolls onto a lane curb disposed on an edge of a lane in which the ADV is moving. The system detects at a second point in time that the same wheel of the ADV rolls off the lane curb of the lane. The contacts between the wheel rolling on and rolling off is detected using a sensor associated with the wheel such as a tire pressure sensor or a motion sensor. The wheel can be any one of the wheels of the ADV, either being a front wheel or a rear wheel. The system calculates an angle between a moving direction of the ADV and a lane direction of the lane based on the time difference between the first point in time and the second point in time in view of a current speed of the ADV. The system then generates a control command (e.g., speed control command, steering control command) based on the angle to adjust the moving direction of the ADV in order to prevent the ADV from further drifting off the lane direction of the lane.

In calculating the angle, according to one embodiment, a distance perpendicular to the lane direction of the lane is calculated from the first point in time to the second point in time. Such a distance is also referred to as a lateral moving distance of the ADV. The angle is then calculated based on the distance and the current speed of the ADV in view of the time difference between the first point in time and the second point in time. The distance perpendicular to the lane direction may be calculated based on a wheel width of the wheel and a curb width of the lane curb. The wheel width may be determined based on the specification of the wheel. Curb width of the lane curb may be determined based on the perception data perceiving the lane curb such as an image of the lane captured by a camera.

According to another aspect of the invention, a lane departure detection system detects at a first point in time that a first wheel of an ADV contacts a lane curb disposed on an edge of a lane in which the ADV is moving. The system detects at a second point in time that a second wheel of the ADV contacts the lane curb of the lane. The contact between the first wheel and the lane curb is detected using a sensor associated with the first wheel such as a tire pressure sensor or a motion sensor. The contact between the second wheel and the lane curb is detected using a sensor associated with the first wheel such as a tire pressure sensor or a motion sensor. The first wheel and the second wheel are different wheels, which can be any of the wheels of the ADV such as a pair of front wheels or rear wheels. The system calculates an angle between a moving direction of the ADV and a lane direction of the lane based on the time difference between the first point in time and the second point in time in view of a current speed of the ADV. The system then generates a control command (e.g., speed control command, steering control command) based on the angle to adjust the moving direction of the ADV in order to prevent the ADV from further drifting off the lane direction of the lane.

In calculating the angle, according to one embodiment, a first distance between the first wheel and the second wheel is determined. The first distance can be the length of an axle coupling the first wheel and the second wheel. A second distance that the ADV has moved perpendicular to the lane direction of the lane (e.g., lateral moving distance) is determined based on the time difference between the first point in time and the second point in time in view of the current speed of the ADV. The angle is then calculated based on a sinusoidal relationship between the first distance and the second distance.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
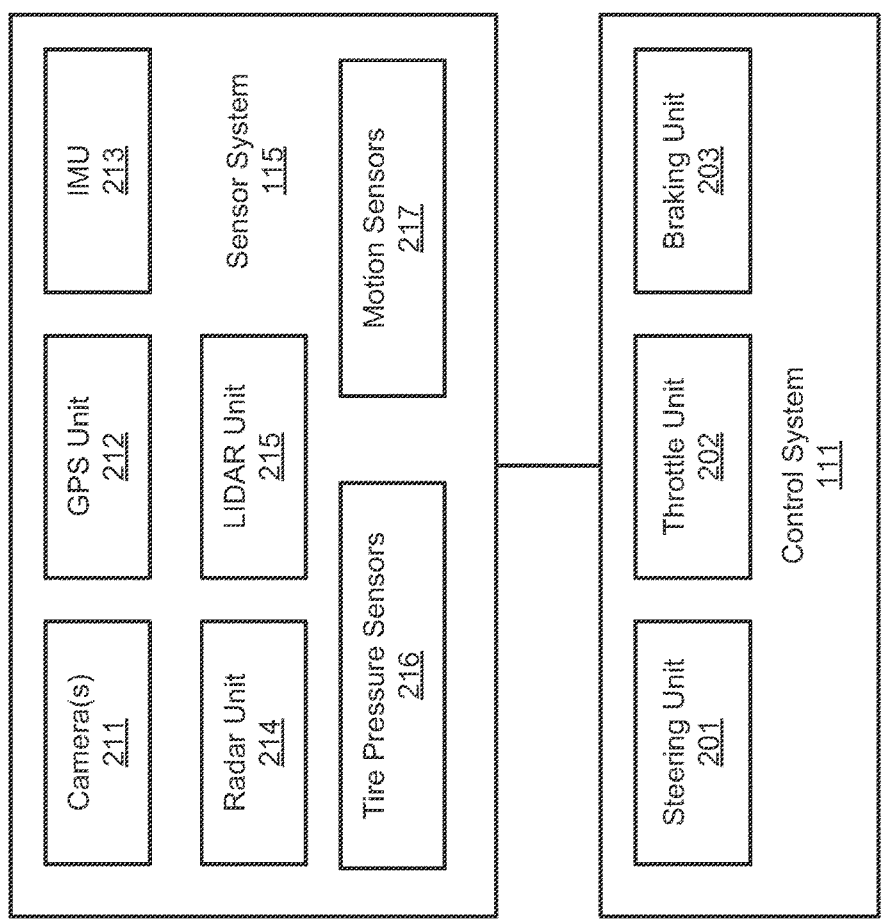
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, sensor system 115 further includes one or more tire pressure sensors 216 and/or one or more motion sensors 217. Each of tire pressure sensors 216 is configured to sense and measure a tire pressure of one of the wheels of the vehicle. In one embodiment, each of the wheels of the ADV is associated with a tire pressure sensor and/or a motion sensor. Such sensors may be disposed or mounted near the corresponding wheel, for example, near a suspension joint associated with the wheel. Thus, when a wheel of the ADV contacts a lane curb, it can be precisely determined which of the wheels of the ADV contacts the lane curb. It can also detect whether the wheel is rolling onto or engaging with the lane curb or is rolling off or disengaging from the lane curb.

The sudden change of the tire pressure of a wheel proportionally represents the impact imposed on the wheel when the wheel contacts a lane curb or rolls on and/or off the lane curb. Each of the motion sensors 217 is configured to sense and measure an amount of motion incurred by a wheel or the ADV. The amount of sudden motion detected may be utilized to determine whether the ADV contacts a lane curb or rolls on and/or off the lane curb. In one embodiment, a motion sensor may be positioned near each wheel or a suspension joint associated with each wheel. The tire pressure data and the motion sensor data may be combined to determine whether the corresponding wheel has contacted a lane curb or rolls on and/or off the lane curb.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 include an algorithm to calculate angle between a moving direction of an ADV and a lane direction of a lane which the ADV is moving. The angle may be calculated in view of a physical dimension of the ADV (e.g., distance between two front or rear wheels, distance between a front wheel and a rear wheel). Such an angle is utilized to determine whether the ADV is departing from the lane and an appropriate control action can be taken to correct such lane departure. Algorithms 124 are then uploaded onto an ADV to be utilized in real-time to detect the potential lane departure.

Figure 3:
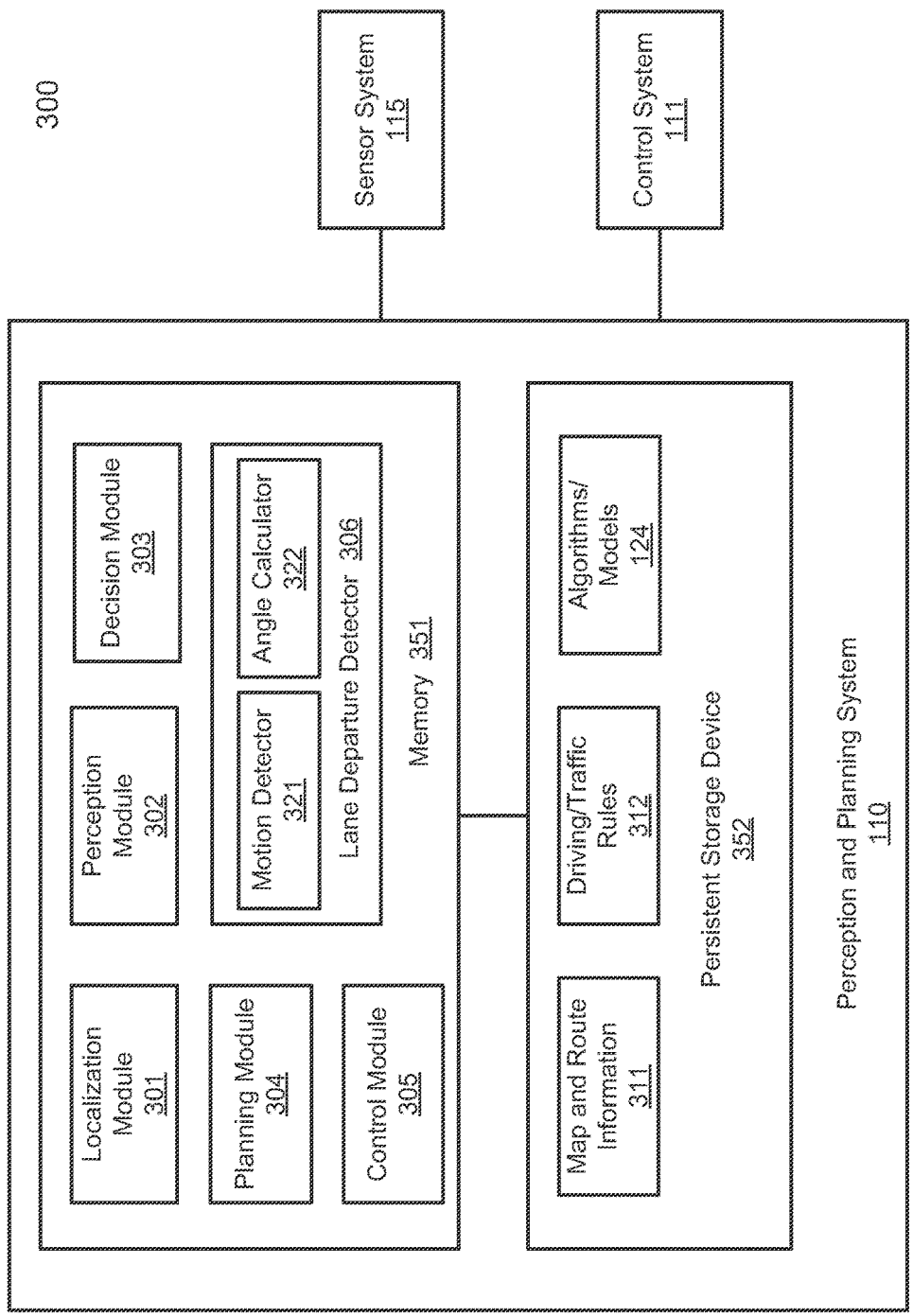
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, control module 305, and lane departure detector or monitor 306.

Some or all of modules 301-306 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-306 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules or driving rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 304 plans a next route segment or path segment, for example, including a target position and the time required for the ADV to reach the target position. Alternatively, planning module 304 may further specify the specific speed, direction, and/or steering angle, etc. In one embodiment, planning module 304 plans a route segment or path segment for the next predetermined period of time such as 5 seconds. For each planning cycle, planning module 304 plans a target position for the current cycle (e.g., next 5 seconds) based on a target position planned in a previous cycle. If the current actual position of the ADV is significantly different from the target position planned by a previous planning cycle, planning module 304 may have to replan the next segment based on the actual position of the ADV instead of the target position of the previous planning cycle. Control module 305 then generates one or more control commands (e.g., throttle, brake, steering control commands) based on the planning and control data of the current cycle.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Lane departure detector or detection module 306 is configured to detect whether the ADV is departing from or drifting off a lane in which the ADV is moving. In one embodiment, lane departure detector 306 is coupled to one or more sensors such as tire pressure sensors 216 and/or motion sensors 217 of FIG. 2 to detect or sense whether the ADV experiences sudden bump or oscillation, for example, in response to contacting a lane curb disposed on an edge of the lane such as a lane shoulder, a lane warning area of a lane, or a lane separator between lanes. In response to such sudden bump or oscillation, lane departure detector 306 determines an angle between a moving direction of the ADV and a lane direction of the lane at the point in time. The angle represents how much the moving direction of the ADV is off compared to the lane direction of the lane (e.g., difference between the moving direction and the lane direction). Based on the angle, planning module 304 and/or control module 305 can decide whether a correction of moving direction is warranted and if so, a new control command is generated and issued to the ADV to correct the moving direction of the ADV.

In one embodiment, the correction of moving direction of the ADV is needed if the angle representing the difference between the moving direction and the lane direction is greater than a predetermined threshold. The predetermined threshold may be determined and configured by a data analytics system (e.g., data analytics system 103) offline based on a large amount of driving statistics collected over a period of time from a variety of vehicles. Such a predetermined threshold may be determined in consideration of safety reasons and/or human drivers' driving behaviors or preferences (e.g., comfort reasons).

According to one embodiment, lane departure detector 306 includes motion detector or detection module 321 and angle calculator 322. Lane departure detector 306 is configured to detect that an ADV is departing from the lane in which the ADV is driving based on sensor data captured when the ADV contact a lane curb. When the ADV contacts the lane curb, motion detector 321 of lane departure detector 306 detects such a sudden motion (e.g., bump, oscillation) via tire pressure sensors and/or motion sensors. Angle calculator 322 calculates an angle of a moving direction of the ADV vs a longitudinal direction of the lane curb.

In one embodiment, the angle may be calculated based on the timing when a wheel of the ADV rolls onto the lane curb and the timing when the wheel of the ADV rolls off the lane curb in view of the speed of the ADV. Alternatively, the angle may be calculated based on the timing when a first wheel (e.g., right front wheel) of the ADV contacts the lane curb and the timing when a second wheel (e.g., left front wheel) of the ADV contacts the lane curb in view of the speed of the ADV. Based on the angle, lane departure detector 306 calculates how much the moving direction of the ADV is off compared to a lane direction of the lane. The lane direction is typically substantially parallel with the longitudinal direction of the lane curb. A control command such as a speed control command and/or a steering control command is generated by planning module 304 and/or control module 305 based on the angle to correct the moving direction of the ADV.

Figure 4:
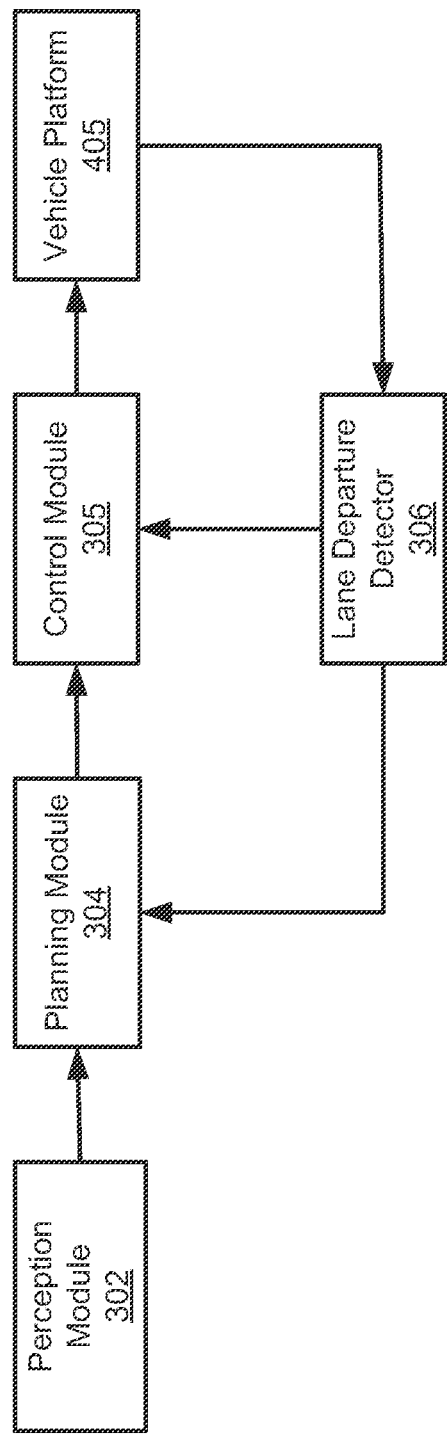
FIG. 4 is a processing flow diagram illustrating a processing flow of detecting and correcting lane departure of an autonomous driving vehicle according to one embodiment of the invention.

FIG. 4 is a processing flow diagram illustrating a processing flow of detecting and correcting lane departure of an autonomous driving vehicle according to one embodiment of the invention. Referring to FIGS. 3 and 4, as described above, based on perception data received from perception module 303, planning module 304 plans a route segment and specifies a target position and the time to be at the target position, etc. Based on the planning and control data provided by planning module 304, control module 305 determines the necessary control command or commands (e.g., speed control command, steering control command) and issues the control commands to vehicle platform 405.

In addition, lane departure detector 306 is coupled to vehicle platform 405 such as tire pressure sensors 216 and/or motion sensors 217 to detect whether the ADV has contacted a lane curb (e.g., lane shoulder, lane separator, lane warning track) and the timing of such contacts. Based on the timing of the contacts by a wheel or wheels of the ADV, an angle representing a difference between a moving direction of the ADV and a lane direction of the lane is calculated. The lane departure information concerning the difference between the moving direction of the ADV and the lane direction of the lane is fed back to planning module 304 and/or control module 305. Planning module 304 and/or control module 305 may determine whether a correction action is needed based on the lane departure information provided by lane departure detector 306. Such a correction may be performed by control module 305. Alternatively, planning module 304 may have to replan the route segment for the next planning cycle in order to correct the moving direction of the ADV. If it is determined that a correction action is needed, a control command is generated and issued to vehicle platform 405 to correct the moving direction of ADV.

According to one aspect of the invention, motion detector 321 of lane departure detector 306 detects at a first point in time that a wheel of an ADV rolls onto a lane curb disposed on an edge of a lane in which the ADV is moving. The motion detector 321 detects at a second point in time that the wheel of the ADV rolls off the lane curb of the lane. The contacts between the wheel rolling onto and rolling off the lane curb is detected using a sensor associated with the wheel such as a tire pressure sensor or a motion sensor. The wheel can be any one of the wheels of the ADV, either being a front wheel or a rear wheel. Angle calculator 322 of lane departure detector 306 calculates an angle between a moving direction of the ADV and a lane direction of the lane based on the time difference between the first point in time and the second point in time in view of a current speed of the ADV. The angle information representing the difference between the lane direction and the moving direction is provided to planning module 304 and/or control module 305. If the difference between the lane direction and the moving direction of the ADV is above a predetermined threshold, planning module 304 and/or control module 305 then generate a control command (e.g., speed control command, steering control command) based on the angle to adjust the moving direction of the ADV in order to prevent the ADV from further drifting off the lane direction of the lane.

In calculating the angle, according to one embodiment, a distance perpendicular to the lane direction of the lane (e.g., lateral moving distance) is calculated from the first point in time to the second point in time. The angle is then calculated based on the distance and the current speed of the ADV in view of the time difference between the first point in time and the second point in time. The distance perpendicular to the lane direction may be calculated based on a wheel width of the wheel and a curb width of the lane curb. The wheel width may be determined based on the specification of the wheel. Curb width of the lane curb may be determined based on the perception data perceiving the lane curb such as an image of the lane curve captured by a camera.

According to another aspect of the invention, motion detector 321 detects at a first point in time that a first wheel of an ADV contacts a lane curb disposed on an edge of a lane in which the ADV is moving. The motion detector 321 detects at a second point in time that a second wheel of the ADV contacts the lane curb of the lane. The contact between the first wheel and the lane curb is detected using a sensor associated with the first wheel such as a tire pressure sensor or a motion sensor. The contact between the second wheel and the lane curb is detected using a sensor associated with the first wheel such as a tire pressure sensor or a motion sensor. The first wheel and the second wheel can be any of the wheels of the ADV such as a pair of front wheels or rear wheels. Angle calculator 322 calculates an angle between a moving direction of the ADV and a lane direction of the lane based on the time difference between the first point in time and the second point in time in view of a current speed of the ADV.

The angle information representing the difference between the lane direction and the moving direction is provided to planning module 304 and/or control module 305. If the difference between the lane direction and the moving direction of the ADV is above a predetermined threshold, planning module 304 and/or control module 305 then generate a control command (e.g., speed control command, steering control command) based on the angle to adjust the moving direction of the ADV in order to prevent the ADV from further drifting off the lane direction of the lane.

In calculating the angle, according to one embodiment, a first distance between the first wheel and the second wheel is determined. The first distance can be the length of an axle coupled to the first wheel and the second wheel. A second distance that the ADV has moved perpendicular to the lane direction of the lane is determined based on the time difference between the first point in time and the second point in time in view of the current speed of the ADV. The angle is then calculated based on a sinusoidal relationship between the first distance and the second distance.

Note that the correction action to correct the moving direction of the ADV may be performed by planning module 304 and/or control module 305 dependent upon how far off the moving direction is from the lane direction. If the difference between the lane direction and the moving direction is significantly larger (e.g., greater than a higher predetermined threshold), planning module 304 may have to perform replanning; otherwise, control module 305 can perform the correction by modifying a previous command or generating a new command.

Figure 5:
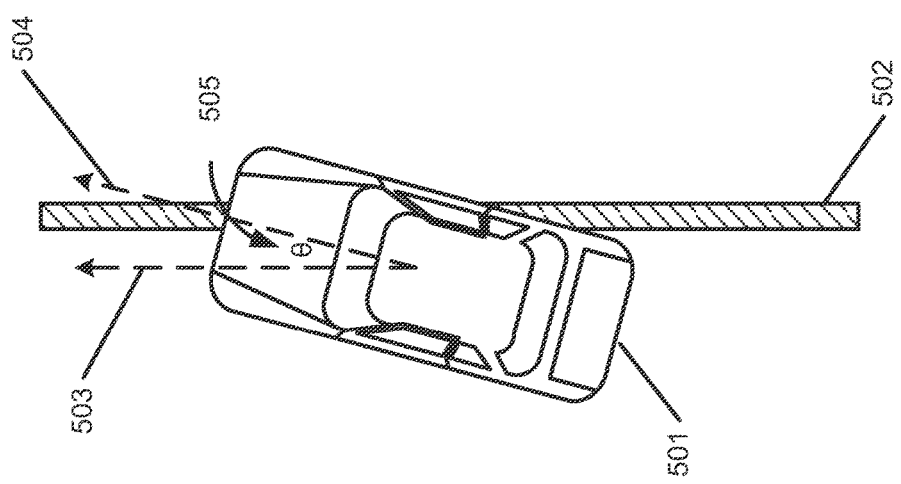
FIG. 5 is a diagram illustrating a typical scenario when a vehicle contacts a lane curb.
Figure 5:
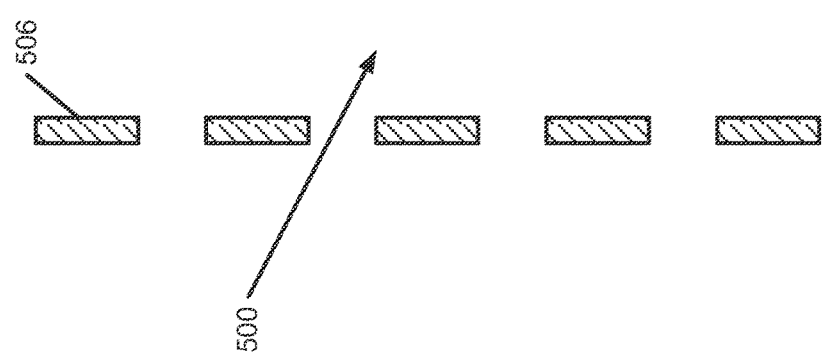

FIG. 5 is a diagram illustrating a typical scenario when a vehicle contacts a lane curb. Referring to FIG. 5, when a wheel or wheels (e.g., a pair of front wheels or rear wheels)

of ADV 501 contact lane curb 502 of lane 500, the sudden motion can be detected using a tire pressure sensor and/or motion sensor associated with the wheel or wheels. In addition, the timing of the contacts of the wheel rolling on and rolling off lane curb 502 or the contacts between the wheels of ADV 502 and lane curb 502 can be recorded. Based on the timing of the contacts, angle 505 can be calculated between lane direction 503 of lane 500 and moving direction 504 of ADV 501. Angle 505 represents the difference between lane direction 503 and moving direction 504. A proper action may be performed to correct moving direction 504 if angle 505 is greater than a predetermined threshold. In this example, lane curb 502 is a single piece of lane curb. Alternatively, lane curb 502 can be an array of lane curb segments distributed along an edge of lane 500, such as, for example, array of lane curb segments 506.

In one embodiment, whether a correction is performed may also be dependent upon the driving circumstances or driving environment at the point in time. For example, if lane 500 is a narrower lane or a lane with heavy traffic, the threshold associated with angle 505 to trigger a correction action may be lower because of a lower error margin of lane departure. Similarly, a higher threshold may be utilized for a wider lane or a lane with less traffic because a higher error margin can be tolerated. Further, a lower threshold may be applied to a two-way traffic lane and a higher threshold may be applied to a one-way traffic lane. The rules governing the thresholds may be determined offline by a data analytics system (e.g., data analytics system 103) based on the driving statistics in the past.

Figure 6:
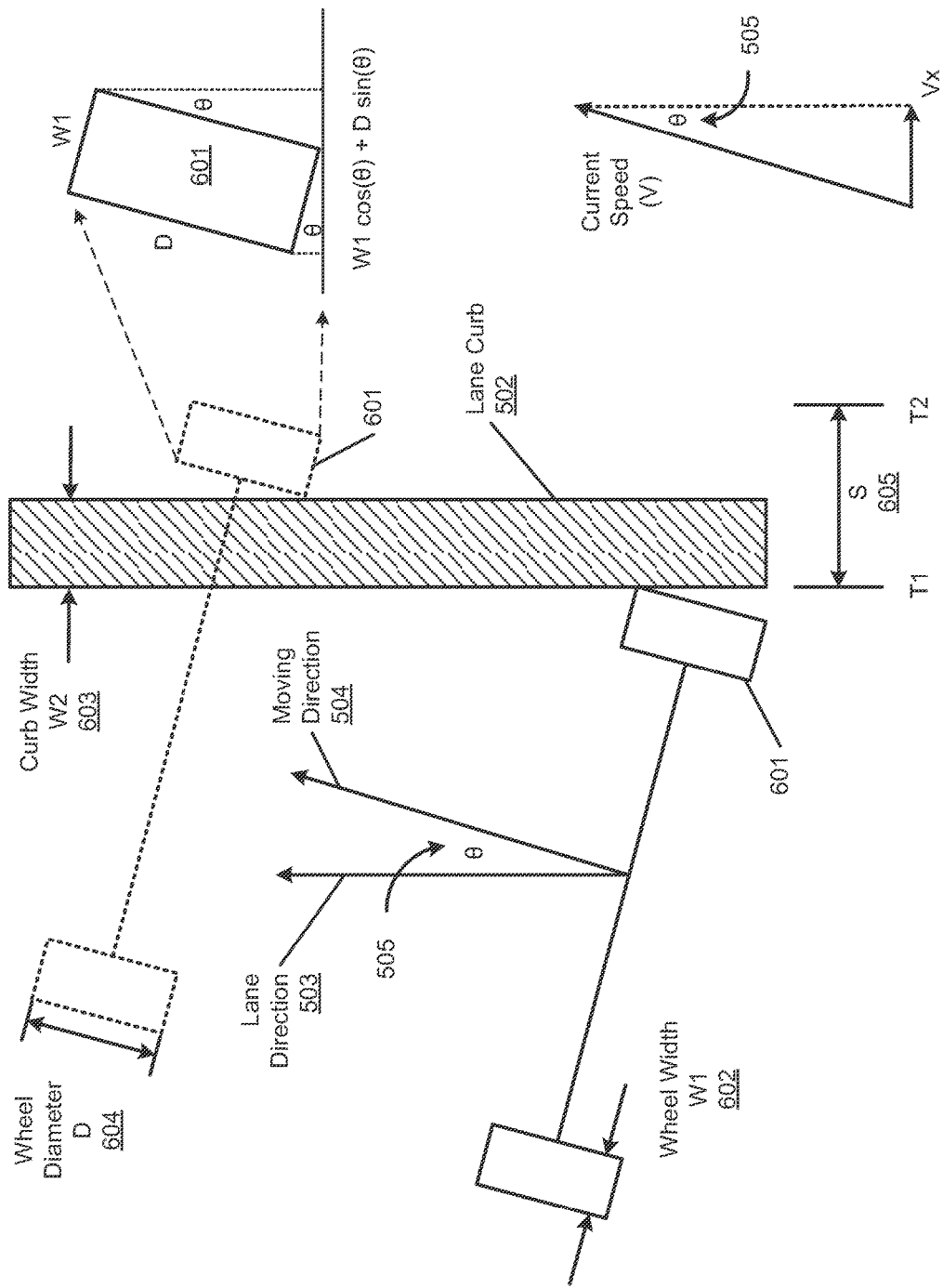
FIG. 6 is a diagram for determining a difference between a moving direction and a lane direction according to one embodiment of the invention.

FIG. 6 is a diagram for determining a difference between a moving direction and a lane direction according to one embodiment of the invention. Referring to FIG. 6, when wheel 601 of the ADV rolls onto a lane curb 502, such a sudden motion is detected, for example, by a tire pressure sensor and/or a motion sensor associated with wheel 601. The time of rolling on movement is recorded (referred to as T1). Subsequently, when wheel 601 of the ADV rolls off lane curb 502, the time of the rolling off movement is recorded (referred to as T2). Based on the difference between time T1 and T2, a lateral moving distance 605 (referred to as S) between the contacting time T1 and T2 can be calculated in view of a current speed (V) of the ADV:

$$S = Vx * |T2 - T1|$$

where Vx refers to the current speed V projected onto the X axis: $Vx = V \sin(\theta)$. Angle $\theta$ represents the angle 505 between moving direction 504 and lane direction 503. Lateral moving distance S refers to a distance that is perpendicular to the lane direction 503 that the ADV has moved between T1 and T2.

On the other hand, distance S can be determined in view of wheel width 602 of wheel 601 (referred to as W1), diameter or wheel size 604 of wheel 601 (referred to as D), and lane curb width 603 (referred to as W2) as follows:

$$S = W1 * \cos(\theta) + D * \sin(\theta) + W2$$

The above two equations can be combined to solve angle $\theta$ as follows:

$$W1 * \cos(\theta) + D * \sin(\theta) + W2 = V * \sin(\theta) |T2 - T1|$$

When angle $\theta$ is small, $\cos(\theta)$ is close to one while $\sin(\theta)$ is close to zero. Thus, S is approximately equal to (W1+W2). The above equation can be simplified to solve angle $\theta$ as follows:

$$W1 + W2 = V * \sin(\theta) |T2 - T1|$$

Note that wheel width W1 is known parameter that can be determined based on the specification of wheel 601 of the ADV. Lane curb width W2 can be estimated based on the perception data that perceives lane curb 502. For example, an image of lane curb 502 captured by a camera can be recognized and analyzed to determine the width of lane curb 502.

Figure 7:
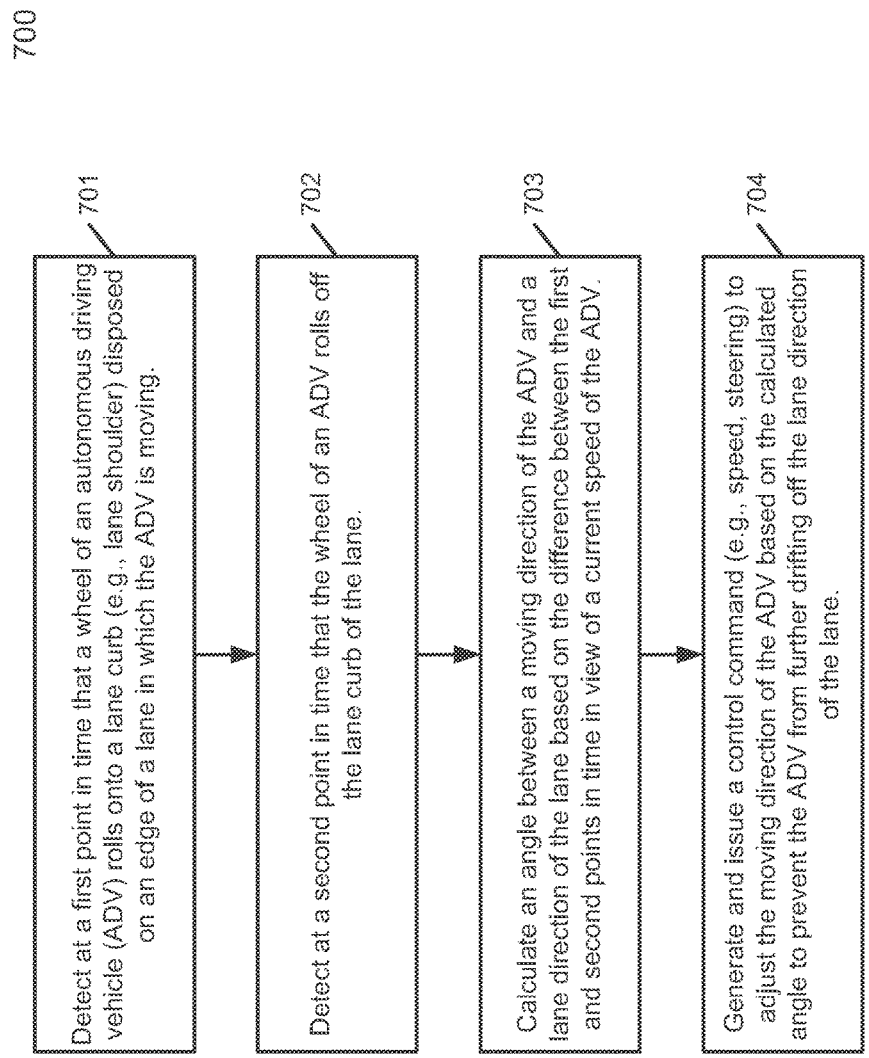
FIG. 7 is a flow diagram illustrating a process of operating an autonomous driving vehicle according to one embodiment of the invention.

FIG. 7 is a flow diagram illustrating a process of operating an autonomous driving vehicle according to one embodiment of the invention. Process 700 may be performed by processing logic which may include software, hardware, or a combination thereof. For example, process 700 may be performed by lane departure detector 306 of FIG. 3. Referring to FIG. 7, in operation 701, processing logic detects at a first point in time that a wheel of an ADV rolls onto a lane curb disposed on an edge of a driving lane in which the ADV is moving. In operation 702, processing logic detects at a second point in time that the same wheel of the ADV rolls off the lane curb. Such detections can be performed using a tire pressure sensor and/or a motion sensor associated with the wheel. In one embodiment, each of the wheels of the ADV is associated with a tire pressure sensor and/or a motion sensor. Such sensors may be disposed or mounted near the corresponding wheel, for example, near a suspension joint associated with the wheel. Thus, when a wheel of the ADV contacts a lane curb, it can be precisely determined which of the wheels of the ADV contacts the lane curb. It can also detect whether the wheel is rolling onto or engaging with the lane curb or the wheel is rolling off or disengaging from the lane curb.

In operation 703, processing logic calculates an angle between a moving direction of the ADV and a lane direction of the lane based on a difference between the first point in time and the second point in time in view of a current speed of the ADV. A moving direction of the ADV is typically perpendicular to a front axle connecting a pair of front wheels or a rear axle connecting a pair of rear wheels. A lane direction of the lane is typically in parallel with a longitudinal direction of a lane curb disposed on an edge of the lane or a longitudinal distribution pattern of an array of lane curb segments. The angle represents the difference between the moving direction and the lane direction, which in turn represents how far the ADV has drifted off the lane. In operation 704, processing logic generates a control command (e.g., speed control command, steering control command) based on the angle to adjust the moving direction of the ADV to prevent the ADV from further drifting off the lane direction of the lane. In one embodiment, the control command to adjust the moving direction is generated when the angle is above a predetermined threshold.

Note that the lane departure detection techniques described above are based on the detection of a single wheel of the ADV rolling on and rolling off a lane curb. According to another aspect of the invention, the lane departure of the ADV can be detected based on multiple wheels (e.g., pair of front wheels, pair of rear wheels, or a front wheel and a rear wheel in combined) of the ADV contacting a lane curb of the lane.

Figure 8:
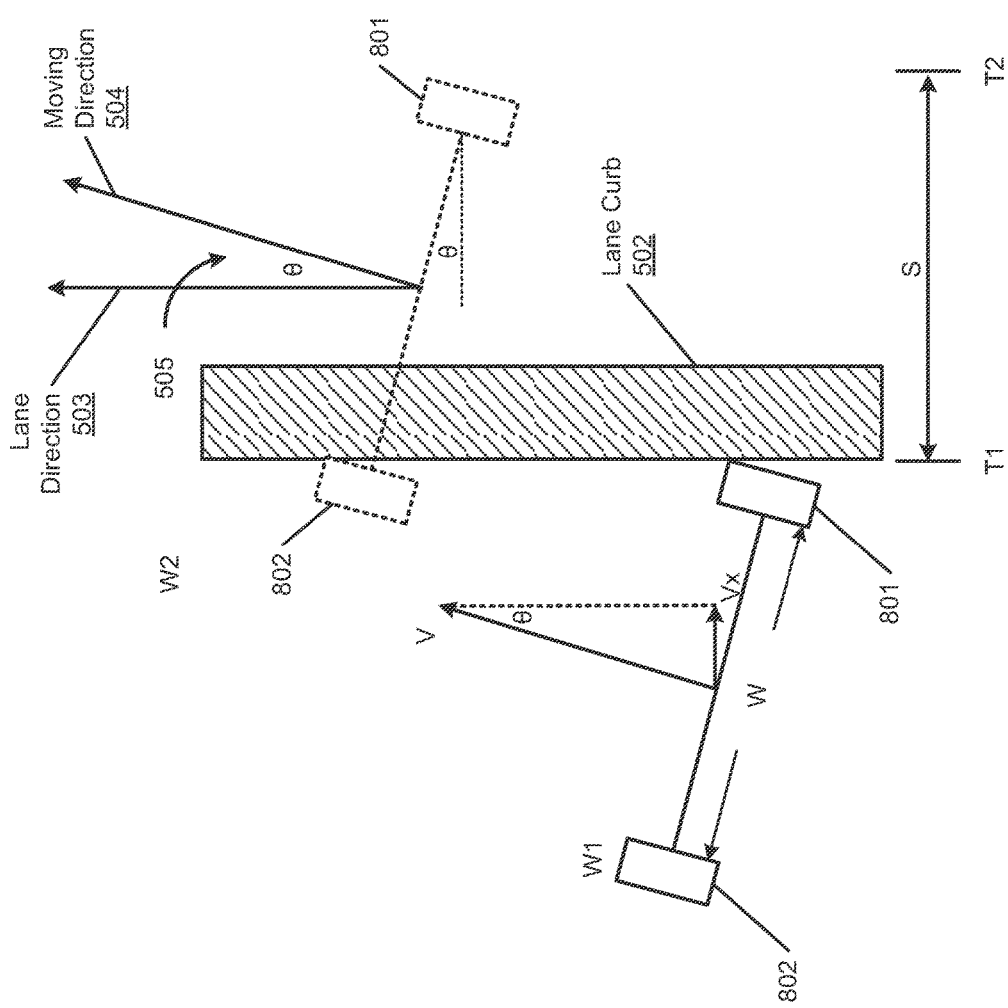
FIG. 8 is a diagram for determining a difference between a moving direction and a lane direction according to another embodiment of the invention.

FIG. 8 is a diagram for determining a difference between a moving direction and a lane direction according to another embodiment of the invention. Referring to FIG. 8, when wheel 801 of the ADV contacts or rolls onto lane curb 502, such a sudden motion is detected, for example, by a tire pressure sensor and/or a motion sensor associated with wheel 801. The time of the contact (T1) is recorded. Subsequently, when another wheel 802 of the ADV contacts or rolls onto lane curb 502, the time of contact (T2) is recorded.

Based on the difference between time T1 and T2, a lateral moving distance (S) between the contacting time T1 and T2 can be calculated in view of the current speed (V) of the ADV:

$$S=Vx*|T2-T1|$$

where Vx is the current speed V projected onto X axis: Vx=V sin(θ). Angle θ represents the angle 505 between moving direction 504 and lane direction 503.

On the other hand, distance S can be determined in view of wheel width (W1) of each wheel, diameter or wheel size (D) of each wheel, and lane curb width (W2) as follows:

$$S=W1*\cos(\theta)+D*\sin(\theta)-W2+W*\cos(\theta)$$

where W represents a length of an axle connecting wheels 801-802. The above two equations can be combined to solve angle θ as follows:

$$W1*\cos(\theta)+D*\sin(\theta)-W2+W*\cos(\theta)=V*\sin(\theta)|T2-T1|$$

When angle θ is small, cos(θ) is close to one while sin(θ) is close to zero. Thus, S is approximately equal to (W1+W2+W). The above equation can be simplified to solve angle θ as follows:

$$W1-W2+W=V*\sin(\theta)|T2-T1|$$

Note that wheel width W1 is known parameter that can be determined based on the specification of wheel 601 of the ADV. Lane curb width W2 can be estimated based on the perception data that perceives lane curb 502. For example, an image of lane curb 502 captured by a camera can be recognized and analyzed to determine the width of lane curb 502. Similarly, the axle length W is also known based on the specification of the ADV. In one embodiment, if W is significantly longer or wider when W1 and W2, the above equation can be simplified as W=V*sin(θ)|T2-T1|.

In this embodiment, wheels 801 and 802 are coupled to the same axle. In one embodiment, the above techniques can be extended to calculate the angle between the moving direction and the lane direction based on wheels that are on difference axles such as a front wheel and a rear wheel of the ADV. In such an embodiment, a distance between a front axle and a rear axle (referred to herein as R) may need to be considered if one wheel is on one side and the other wheel is on the other side of the ADV. The lateral moving distance S may further include distance R projected onto the X axis: R*sin(θ).

Thus, if the front wheel and the rear wheel are on different sides of the ADV, one on the driver side and the other one on the passenger side, lateral moving distance S can be defined as follows:

$$S=W1*\cos(\theta)+D*\sin(\theta)+W2+W*\cos(\theta)+R*\sin(\theta)$$

If angle θ is small, the distance R*sin(θ) may be ignored for simplification in calculating the angle: S=W1+W2+W. If the wheels are on the same side of the ADV, S can be defined as:

$$S=W1*\cos(\theta)+D*\sin(\theta)+W2+R*\sin(\theta)$$

If angle θ is small, the distance R*sin(θ) and D*sin(θ) may be ignored for simplification in calculating the angle: S=W1+W2.

Figure 9:
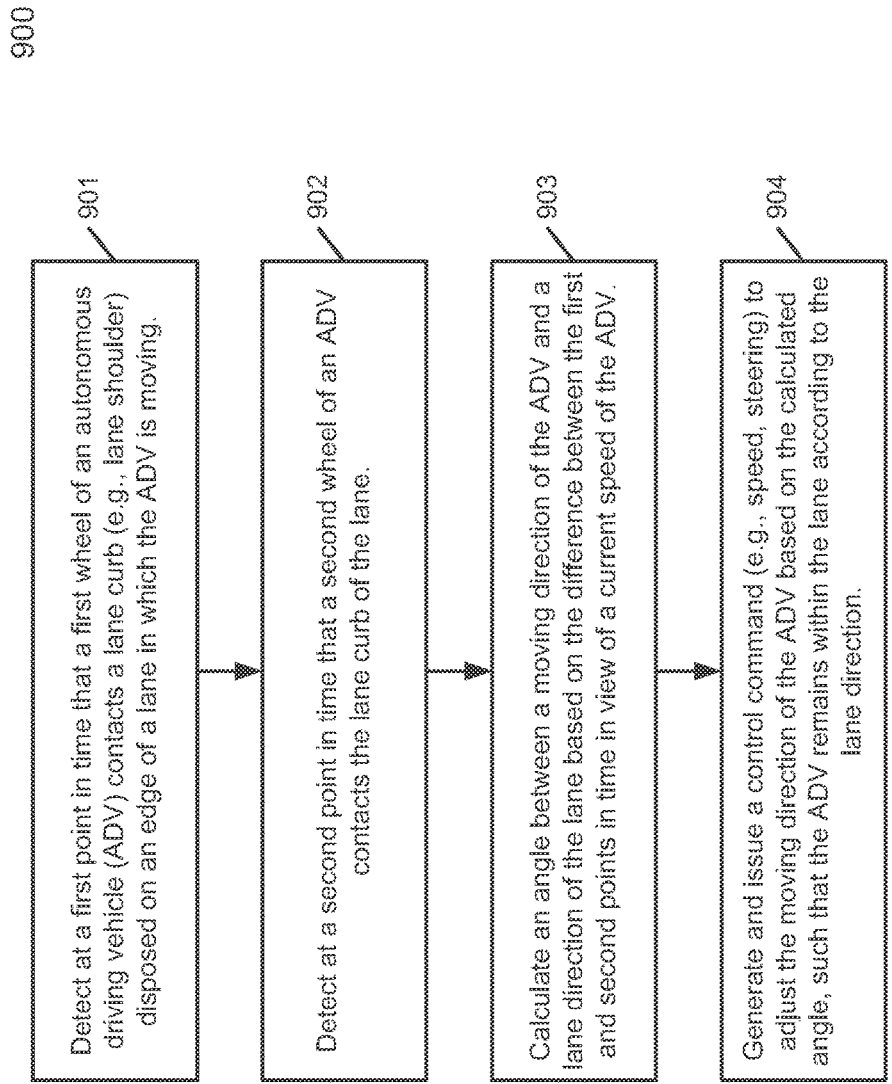
FIG. 9 is a flow diagram illustrating a process of operating an autonomous driving vehicle according to another embodiment of the invention.

FIG. 9 is a flow diagram illustrating a process of operating an autonomous driving vehicle according to another embodiment of the invention. Process 900 may be performed by processing logic which may include software, hardware, or a combination thereof. For example, process 900 may be performed by lane departure detector 306 of FIG. 3. Referring to FIG. 9, in operation 901, processing logic detects at a first point in time that a first wheel (e.g., a right front wheel or a right rear wheel) of an ADV contacts a lane curb (e.g., lane shoulder, lane separator, lane warning track) of a lane in which the ADV is moving. The lane curb is disposed on an edge of the lane or between lanes. In operation 902, processing logic detects at a second point in time that a second wheel of the ADV (e.g., a left front wheel or a left rear wheel) contacts the lane curb. In operation 903, processing logic calculates an angle between a moving direction of the ADV and a lane direction of the lane based on the first point in time and the second point in time in view of a current speed of the ADV. In operation 904, processing logic generates a control command to adjust the moving direction of the ADV based on the calculated angle, such that the ADV remains within the lane according to the lane direction of the lane.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 10:
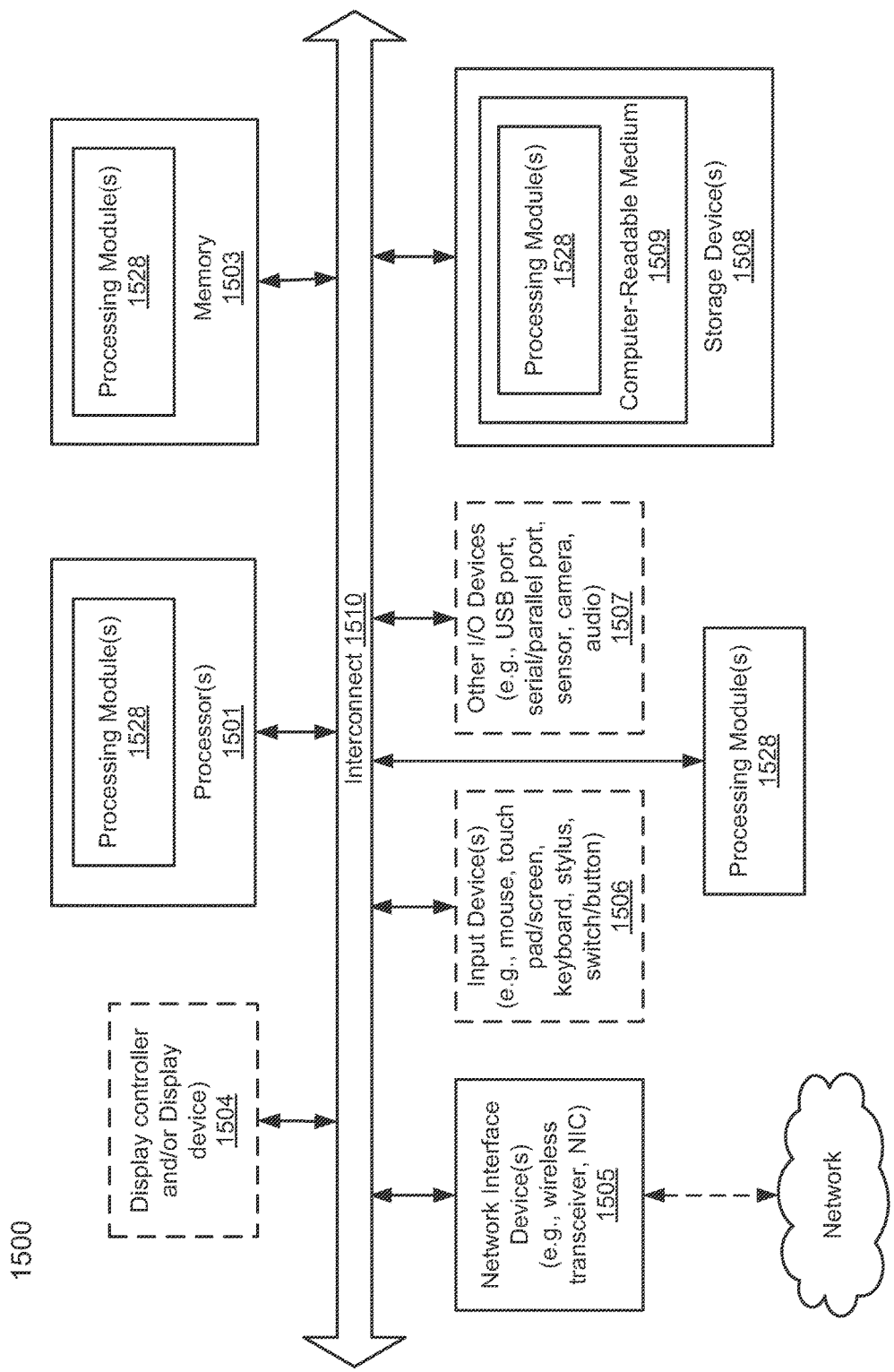
FIG. 10 is a block diagram illustrating a data processing system according to one embodiment.

FIG. 10 is a block diagram illustrating an example of a data processing system which may be used with one embodiment of the invention. For example, system 1500 may represent any of data processing systems described above performing any of the processes or methods described above, such as, for example, data processing system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein.

Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 304, control module 305, and/or lane departure detector 306 of FIG. 3. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating an autonomous driving vehicle, the method comprising:
    detecting, a first point in time, that a wheel of an autonomous driving vehicle (ADV) rolls onto a lane curb disposed on an edge of a lane in which the ADV is moving;
    detecting, at a second point in time, that the wheel of the ADV rolls off the lane curb of the lane;
    calculating an angle between a moving direction of the ADV and a lane direction of the lane based on a difference between the first point in time and the second point in time in view of a current speed of the ADV, including
        determining a curb width of the lane curb based on perception data that perceives the lane curb,
        calculating a distance perpendicular to the lane direction of the lane that the ADV moves from the first point in time and the second point in time based on the curb width and a wheel width of the wheel determined based on a specification of the wheel, and
        determining the angle based on the distance and the current speed of the ADV in view of the difference between the first point in time and the second point in time; and
    generating a control command based on the angle to adjust the moving direction of the ADV to prevent the ADV from further drifting off the lane direction of the lane.

2. The method of claim 1, further comprising determining whether the angle is above a predetermined threshold, wherein the control command is generated if the angle is above the predetermined threshold.

3. The method of claim 2, wherein the predetermined threshold is determined based on a lane configuration of the lane.

4. The method of claim 1, wherein the perception data perceiving the lane curb includes one or more images of the lane curb captured by one or more cameras.

5. The method of claim 1, wherein the wheel contacting the lane curb is detected via a tire pressure sensor or a motion sensor disposed near the wheel.

6. A non-transitory machine-readable medium having instructions stored therein, which when executed by a processor, cause the processor to perform operations of operating an autonomous driving vehicle, the operations comprising:

detecting, a first point in time, that a wheel of an autonomous driving vehicle (ADV) rolls onto a lane curb disposed on an edge of a lane in which the ADV is moving;
detecting, at a second point in time, that the wheel of the ADV rolls off the lane curb of the lane;
calculating an angle between a moving direction of the ADV and a lane direction of the lane based on a difference between the first point in time and the second point in time in view of a current speed of the ADV, including
 determining a curb width of the lane curb based on perception data that perceives the lane curb,
 calculating a distance perpendicular to the lane direction of the lane that the ADV moves from the first point in time and the second point in time based on the curb width and a wheel width of the wheel determined based on a specification of the wheel, and
 determining the angle based on the distance and the current speed of the ADV in view of the difference between the first point in time and the second point in time; and
generating a control command based on the angle to adjust the moving direction of the ADV to prevent the ADV from further drifting off the lane direction of the lane.

7. The machine-readable medium of claim 6, wherein the operations further comprise determining whether the angle is above a predetermined threshold, wherein the control command is generated if the angle is above the predetermined threshold.

8. The machine-readable medium of claim 7, wherein the predetermined threshold is determined based on a lane configuration of the lane.

9. The machine-readable medium of claim 6, wherein the perception data perceiving the lane curb includes one or more images of the lane curb captured by one or more cameras.

10. The machine-readable medium of claim 6, wherein the wheel contacting the lane curb is detected via a tire pressure sensor or a motion sensor disposed near the wheel.

11. A data processing system, comprising:
 a processor; and
 a memory coupled to the processor to store instructions, which when executed by the processor, cause the processor to perform operations, the operations including
  detecting, a first point in time, that a wheel of an autonomous driving vehicle (ADV) rolls onto a lane curb disposed on an edge of a lane in which the ADV is moving,
  detecting, at a second point in time, that the wheel of the ADV rolls off the lane curb of the lane,
  calculating an angle between a moving direction of the ADV and a lane direction of the lane based on a difference between the first point in time and the second point in time in view of a current speed of the ADV, including
   determining a curb width of the lane curb based on perception data that perceives the lane curb,
   calculating a distance perpendicular to the lane direction of the lane that the ADV moves from the first point in time and the second point in time based on the curb width and a wheel width of the wheel determined based on a specification of the wheel, and
   determining the angle based on the distance and the current speed of the ADV in view of the difference between the first point in time and the second point in time, and
  generating a control command based on the angle to adjust the moving direction of the ADV to prevent the ADV from further drifting off the lane direction of the lane.

12. The system of claim 11, wherein the operations further comprise determining whether the angle is above a predetermined threshold, wherein the control command is generated if the angle is above the predetermined threshold.

13. The system of claim 12, wherein the predetermined threshold is determined based on a lane configuration of the lane.

14. The system of claim 11, wherein the perception data perceiving the lane curb includes one or more images of the lane curb captured by one or more cameras.

15. A computer-implemented method for operating an autonomous driving vehicle, the method comprising:
 detecting, a first point in time, that a first wheel of an autonomous driving vehicle (ADV) contacts a lane curb disposed on an edge of a lane in which the ADV is moving;
 detecting, at a second point in time, that a second wheel of the ADV contacts the lane curb of the lane;
 calculating an angle between a moving direction of the ADV and a lane direction of the lane based on a difference between the first point in time and the second point in time in view of a current speed of the ADV; and
 generating a control command based on the angle to adjust the moving direction of the ADV to prevent the ADV from further drifting off the lane direction of the lane.

16. The method of claim 15, wherein calculating an angle between a moving direction of the ADV and a lane direction of the lane comprises:
 determining a first distance between the first wheel and the second wheel; and
 determining a second distance that the ADV has moved perpendicular to the lane direction of the lane based on the difference between the first point in time and the second point in time in view of the current speed of the ADV, wherein the angle is calculated based on the first distance and the second distance.

17. The method of claim 16, wherein the angle is calculated based on a sinusoidal relationship between the first distance and the second distance.

18. The method of claim 15, wherein the first wheel and the second wheel of the ADV is coupled to each to via an axle.

19. The method of claim 15, wherein the first wheel contacting the lane curb is detected via a first tire pressure sensor or a first motion sensor associated with the first wheel.

20. The method of claim 19, wherein the second wheel contacting the lane curb is detected via a second tire pressure sensor or a second motion sensor associated with the second wheel.

21. A non-transitory machine-readable medium having instructions stored therein, which when executed by a processor, cause the processor to perform operations of operating an autonomous driving vehicle, the operations comprising:

detecting, a first point in time, that a first wheel of an autonomous driving vehicle (ADV) contacts a lane curb disposed on an edge of a lane in which the ADV is moving;

detecting, at a second point in time, that a second wheel of the ADV contacts the lane curb of the lane;

calculating an angle between a moving direction of the ADV and a lane direction of the lane based on a difference between the first point in time and the second point in time in view of a current speed of the ADV; and generating a control command based on the angle to adjust the moving direction of the ADV to prevent the ADV from further drifting off the lane direction of the lane.

22. The machine-readable medium of claim 21, wherein calculating an angle between a moving direction of the ADV and a lane direction of the lane comprises:

determining a first distance between the first wheel and the second wheel; and determining a second distance that the ADV has moved perpendicular to the lane direction of the lane based on the difference between the first point in time and the second point in time in view of the current speed of the ADV, wherein the angle is calculated based on the first distance and the second distance.

23. The machine-readable medium of claim 22, wherein the angle is calculated based on a sinusoidal relationship between the first distance and the second distance.

24. The machine-readable medium of claim 21, wherein the first wheel and the second wheel of the ADV is coupled to each to via an axle.

25. The machine-readable medium of claim 21, wherein the first wheel contacting the lane curb is detected via a first tire pressure sensor or a first motion sensor associated with the first wheel.

26. The machine-readable medium of claim 25, wherein the second wheel contacting the lane curb is detected via a second tire pressure sensor or a second motion sensor associated with the second wheel.

* * * * *